(12) United States Patent
Kleinrock et al.

(10) Patent No.: US 7,840,447 B2
(45) Date of Patent: Nov. 23, 2010

(54) PRICING AND AUCTIONING OF BUNDLED ITEMS AMONG MULTIPLE SELLERS AND BUYERS

(76) Inventors: Leonard Kleinrock, 318 N. Rockingham Ave., Los Angeles, CA (US) 90049; Yu Cao, 439 S. New Ave., Monterey Park, CA (US) 91755

( * ) Notice: Subject to any disclaimer, the term of this patent is extended or adjusted under 35 U.S.C. 154(b) by 3 days.

(21) Appl. No.: 12/262,059

(22) Filed: Oct. 30, 2008

(65) Prior Publication Data

US 2009/0125414 A1 May 14, 2009

Related U.S. Application Data

(60) Provisional application No. 60/983,815, filed on Oct. 30, 2007.

(51) Int. Cl.
*G06Q 30/00* (2006.01)
*G06F 17/30* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | |
|---|---|---|---|
| 5,905,975 A | 5/1999 | Ausubel | |
| 5,918,213 A * | 6/1999 | Bernard et al. ................. | 705/26 |
| 6,035,288 A | 3/2000 | Solomon | |
| 6,041,308 A * | 3/2000 | Walker et al. ................. | 705/14 |
| 6,272,473 B1 | 8/2001 | Sandholm | |
| 6,584,451 B1 | 6/2003 | Shoham | |
| 7,010,505 B2 | 3/2006 | Boutilier | |
| 7,043,446 B1 | 5/2006 | Dietrich | |
| 7,076,447 B1 | 7/2006 | Peyser | |
| 7,103,566 B2 | 9/2006 | Silva | |
| 7,133,841 B1 | 11/2006 | Wurman | |
| 7,146,330 B1 | 12/2006 | Alon | |
| 7,188,080 B1 | 3/2007 | Walker | |
| 7,219,076 B1 * | 5/2007 | Racine ........................ | 705/26 |
| 2002/0184060 A1 * | 12/2002 | Schmitz et al. ................ | 705/6 |
| 2004/0249883 A1 * | 12/2004 | Srinivasan et al. .......... | 709/203 |
| 2007/0143155 A1 * | 6/2007 | Whitsett et al. ................ | 705/5 |

OTHER PUBLICATIONS

"Dotting the i's and crossing the t's: ensuring the best IT contract. (Special Advertising Section)." Healthcare Financial Management, 58 , 2 , IT2(15). Feb. 2004.*
Rothkopf, et al. DIMACS Technical Report 95-09, Computationally Manageable Combinatorial Auctions.

* cited by examiner

*Primary Examiner*—Jeffrey A Smith
*Assistant Examiner*—Resha Desai
(74) *Attorney, Agent, or Firm*—Fish & Associates, PC

(57) ABSTRACT

A number of sets of methods and apparatuses applicable to online shopping are disclosed. One set, "Bin Packing Methods with Approximate Membership", includes methods in pricing and auctioning a bundle of items, some of which could belong to another bundle. Significantly, the membership of a bundle, during pricing and auction, could change. Another set, the "Shopping Console", puts a structure into the online shopping experience, so that through one interface various shopping activities can be facilitated, including but not limited to researching, pricing, negotiation, group buying, and tracking of purchases. Still another set, "Flash Mob Shopping", allows sellers and a (spontaneous) group of shoppers to connect on prices without requiring shoppers' hard commitments, and with sellers revealing only necessary price information.

10 Claims, 11 Drawing Sheets

| Items 310 | Specifications 320 | Purchasing Attributes 330 | Directives 340 |
|---|---|---|---|
| overall | | "at most 3 shipments" | "accept entire deal" |
| 1 | SONY DSC T50, $300. | "acceptable at $295", | "negotiate" |
| 2 | Sony 2GB Memory Stick MSX-M2GS, $69.99 | "acceptable at $70", "must have", don't care which store | "accept this item" |
| 3 | W222-1004 TigerDirect camera kit | "ok-to-have", "acceptable at $25" | "negotiate" |

Figure 3

| Items 410 | Specifications 420 | Confirmation 430 | Shipping 440 | Rebates 450 |
|---|---|---|---|---|
| 1 | SONY DSC T50 | Received. | Arrives 6/1 | Rebate mailed. |
| 2 | Sony 2GB Memory Stick | Not received. | n/a | n/a |
| 3 | … | … | | |

Figure 4

| Number of shoppers | Price each |
|---|---|
| 1 | $299 |
| 2 | $289 |
| 3 | $275 |
| 4 | $250 |
| 5 | {yet to reveal} |
| 6 | {yet to reveal} |

| | CONFIG PAGE | 10/20/07 |
|---|---|---|
| $ LEAST COST | CAM | CONSIDERING |
| $ CURRENT COST | MC | ✓ NO |
| | KIT | ○ YES |

VIEW 1 — CAM
- CAMERA BEACH ✓
- CAMERA FRY: ____
- BO₁ CAMERA MC
- BO₂ CAMERA KIT
- MC
- KIT

VIEW 2 — CAM
- CAM
- ~~BO₁~~
- ~~BO₂~~
- MC
- KIT

VIEW 3 — CAM
- ~~CAM~~
- BO₁
- ~~BO₂~~
- ~~MC~~
- KIT

VIEW 4 — CAM
- CAM
- BO₁
- BO₂
- MC
- ~~KIT~~

PRICING AND AUCTIONING OF BUNDLED ITEMS AMONG MULTIPLE SELLERS AND BUYERS

This application claims the benefit of priority to U.S. Provisional Application having Ser. No. 60/983,815 filed on Oct. 30, 2007.

FIELD OF THE INVENTION

The field of the invention is online shopping.

BACKGROUND

According to "State of Retailing Online 2007" (Forrest Research), online shopping, excluding travel, has become a $175 billion phenomenon in the United States as of this writing in mid 2007. This large volume of traffic has spawned numerous inventions, but none that adequately address retailing and purchasing of bundles.

Among other things, there are continuing needs for more effective: (I) pricing and auctioning a bundle of items to be purchased; (II) user interfaces that deliver an integrated shopping experience; and (III) methods for group buying.

(I) Pricing and Auctioning a Bundle of Items to be Purchased

Consider a buyer interested in purchasing a bundle of items (interchangeably called a "package of items", or simply "multiple items" as used herein), from at least one seller. It is preferred that a "pricing" is done by software, so that a "feasible purchasing solution" is presented to the buyer. One example of such bundles is travel "Custom Packages" offered by Orbitz, packaging hotel stays and flight tickets.

This pricing step addresses a combinatorial optimization problem, which is called "bin packing pricing with an approximate membership" as described herein. Once pricing of a bundle is done, at least one item in the bundle could be auctioned to a number of sellers, and the one offering the lowest price wins the auction.

There are a number of patents on combinatorial auctioning methods, which can be helpful in solving the "bin packing pricing with an approximate membership". U.S. Pat. No. 7,188,080, Systems and methods wherein a buyer purchases products in a plurality of product categories, Walker, et al., Mar. 6, 2007, claims "facilitating a transaction, comprising: receiving, from a buyer, an indication of a plurality of product categories, each product category being associated with a plurality of products". U.S. Pat. No. 6,035,288, Solomon, Mar. 7, 2000, Interactive computer-implemented system and method for negotiating sale of goods and/or services, claims an "engine which utilizes said merchant character data and said data inputted by a customer to generate responses to said data inputted by said customer according to said behavioral attributes". U.S. Pat. No. 5,905,975, Computer implemented methods and apparatus for auctions, Ausubel, May 18, 1999, claims a method for conducting online auctions; and there have been 101 patents that have cited this patent. Other patents include the following: U.S. Pat. No. 7,133,841, Method and computer system for conducting a progressive, price-driven combinatorial auction. U.S. Pat. No. 7,010,505, Method of selecting one or more bids in a combinatorial auction. U.S. Pat. No. 7,043,446, Method for determining the set of winning bids in a combinatorial auction. U.S. Pat. No. 6,272,473, Method, apparatus, and embodied data structures for optimal anytime winner determination in combinatorial auction-type problems.

Combinatorial methods have also been addressed outside the patent literature. The relevant academic literature, for example, includes Rothkopf et al., DIMACS Technical Report 95-09, Computationally Manageable Combinatorial Auctions. In addition, CombineNet, uGenie.com and CampusBooks.com feature pricing bundles (with no auctioning involved). Those systems, however, treat bundles as sets of discrete items, thereby reducing the optimization problem to a form that is too simplistic to capture good deals for shoppers.

In addition, the prior art fails to address the following desirable characteristics:

a. invariant elements, in which bundles can be fixes with respect to one or more of the bundle members;

b. conclusion at will, in which an auction can terminate at any iteration, due to the "invariant" property;

c. non-monotonic price changes, in which the total price typically goes down, but is not guaranteed to go down;

d. substituted bundles, in which an item might be removed, temporarily or permanently, from the bundle; a new item might be added into the bundle; a new bundle of items might be added, whose price might have been fixed;

e. handling of soft commitments, in which buyers need not commit to purchasing any items until the final sale;

f. suggestive biddings for sellers;

g. ability to execute previously stored bidding algorithms for buyers and/or sellers;

h. multiple means of interacting with bidding activities of sellers, in which bidding by sellers could be conducted by software of sellers, or by humans working for sellers; and i. methods of providing differing degrees of information to auction participants, possibly depending on financial incentives provided by potential participants.

(II) User Interface that Delivers an Integrated Shopping Experience

Consider a shopper who starts with an "idea" of buying a digital camera as a gift for a 10 year old girl. The shopper begins the search online, and after searching for desired characteristics, decides on a brand and model number. She then goes on a comparison shopping site (e.g., Shopzilla.com), types in the model number, and gets a listing of prices from multiple vendors.

The process is typically arduous, possibly requiring hours of work, investigation of a diversity of online sites, and at the conclusion of the exercise, the outcome is not always the best combination of price, delivery schedule and so forth for the shopper. Moreover, the complexity grows exponentially if the shopper is trying to secure the best overall prices on a bundle of goods.

Thus, there is a clear and present need for a tool that puts a structure into everyday online shopping activities. There is also a need for a user interface that's not too complicated to navigate (therefore not too hard to build and has a fast response time), and serves the need of researching, assembling, and pricing the most popular bundles.

These issues can be readily appreciated with examples of existing shopping websites. Some of the prior art from web sites, mostly comparison shopping sites, are listed in an article on Forbes magazine's web site: http://www.forbes.com/bow/b2c/category.jhtml?id=100. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

In CNet's comparison shopping site, for example, a search for a digital camera will show, in the upper part of the page under the title "Select filters to refine your results", four columns of suggestions: "Find by Price", "Find by Resolution", "Find by Manufacturer", or "Find by" other criteria (see http://shopper.cnet.com/4144-5_9-0.html?query=digital+camera&tag=srch&search Type=sh). Significantly, the number of choices drops as the search gets more specific.

AOL's comparison shopping site is similar (see http://shopping.aol.com/instore/search?op=search&k=digital+camera&rid=4112&id=9&view=list&sbox=1&refCode=aolpartner_shop search&attr=vendors,PAN&attr=popup1,10:975&sbox=1). A panel box for "Shorten your results" is present, with 6 pull-down menus for "Manufacturer", "Mega-Pixels", "Optical Zoom", "Camera/Lens Type", "Memory Type", and "LCD Screen Size". The design is reminiscent of a typical interface to searching a database, in which attribute-value pairs are filled.

The shopping site Become.com is again similar (see http://www.become.com/shop?q=digital+camera&dcid=7&v=grid&pcolor=-1&scolor=-1&fltr_price=16000%2C98000&min_price=&max_price=&fltr_brand=canon&fltr_category=camera-photo%20&fltr_category=cameraphoto&fltr_category=cameraphoto). There, a search for "digital camera" can be narrowed by the following: "find by color", "find by brand", "find by store", "find by category", "find by flash functions", and "find by focus type", each of which has a list of clickable items.

One problem that is not addressed at all by the various prior art sites is distinguishing between major and minor items. For example, when shopping for a "major item" such as a digital camera, a shopper might want to also purchase a carrying case or an extra battery. None of the existing sites allow a shopper to fix on a particular major item, while allowing variation in the minor items of a bundle.

The closest that the prior art delivers in this respect are customizations of a given item. For example, at the "Configuration interface" at Dell.com, a buyer can customize a particular computer model by selecting a specification for "Processor", "Operating System", "LCD Panel", "Memory", "Hard Drive", "Optical Drive", "Video Card", and "Sound Option". The interface offers a "LIST VIEW" and an "ICON VIEW" (see http://configure.us.dell.com/dellstore/config.aspx?c=us&cs=19&l=en&oc=DNCWHG1&s=dhs).

Similarly, at WalMart.com, a shopper can select a digital camera, and then "Accessories to Buy" (five items to click on), or "Similar Items", in this particular case, an Olympus Digital Camera and a Polaroid P310 Photo Printer (see http://www.walmart.com/catalog/product.do?cpncode=08-25164850-2&dest=9999999997&product_id=5359049&sourceid=1500000000000003129160&srccode=cii_9324560).

The experience at TriStateCamera.com is also similar. With a selected digital camera model, two "KIT SPECIALS" are presented. Also, to the right of the page, about a dozen "Recommended Accessories" can be clicked on (see http://www.tristatecamera.com/lookat.php?refid=7&sku=OLYSTY710).

Shopping for kits at BuyDig.com or mWave.com is again similar. With a particular digital camera, on BuyDig.com's web site some point in early 2007, five kits are listed under the tab "Money Saving Packages". This is a very common way for online stores to offer kits. For one thing, such pre-packaged kits do not allow users to pick-and-choose items of interest. For another thing, such pre-packaged kits make apples-to-apples comparisons difficult (see http://www.buydig.com/shop/product.aspx?omid=118&utm_id=14&ref=nextag&utm_source=NexTag&utm_medium=cpc&utm_campaign=OMST710&sku=OMST710). At mWave.com, once a digital camera is chosen, next to the "BUY" button, there are four pull down menus for choosing accessories (see http://www.mwave.com/mwave/skusearch.hmx?SCriteria=3000637&CartID=done&nextloc=).

BlueNile.com focuses on selling diamonds, rings and other jewelry, and has a wonderful interface. On its "search" page, a user can specify "search criteria", which include cut, carat, clarity, color, among others. Criteria are typically parameterized by sliders. When a user moves a slider, search results change accordingly. Further, search criteria can be changed with the "add/move search criteria" interface. But even there the interface does nothing to help a shopper find the best price for a basket of goods (see http://www.bluenile.com/diamond_search.asp?track=dss&filter_id=0).

(III) There is a Need for an Effective Method for Group Buying

It is not unusual for at least two buyers to aggregate their purchase demands, and make joint commitments to the same purchasing solution. This phenomenon is typically called "group buying".

There are a number of works in group buying, some of which are listed below. U.S. Pat. No. 6,584,451, Shoham, et al., Jun. 24, 2003, Facilitator for aggregating buyer power in an on-line market system. U.S. Pat. No. 7,146,330, Alon, et al., Dec. 5, 2006, Method and system for creating and managing groups for increasing buying power on the world wide web. U.S. Pat. No. 7,076,447, Peyser, et al., Jul. 11, 2006, Systems and methods for aggregating buyers for the purchase of telecommunication services via a network.

Further, circa late 1990s and early 2000s, there was a number of group buying sites, such as Mercata, Accompany (later changed its name to MobShop), actBIG, ZWirl, and C-Tribe. A description of how such sites work can be found at the following web page http://www.epinions.com/webs-review-7751-ABE9F9F-3964F27D-prod 1.

The general concept of group buying is that groups of members get together in 'blocs' to buy a product, bringing the price down. Any member can organize a 'bloc', and organizers can be rewarded with a commission on the sale. In the case of ActBig, for example, organizers can secure half of the commission on the sale, which is usually 5%. Members can also post messages to see if other members are interested in a product before they organize a bloc. These three basic functions of the site are separated into three areas: 'BigDeals' (buying), 'BigIdeas' (organizing blocs), and 'BigTalk' (messaging). This makes navigating the site very easy. Functioning blocs and the message boards are then further divided into categories according to the type of product being purchased or discussed."

The group buying situation is effectively a reverse auction, where at least one shopper posts something to be bid by at least one seller, among which the one who offers the lowest price wins the bid. Compared to time-test auctions on eBay, there are two practical difficulties with reverse auction, and its concatenation with group buying: First is the difficulty of securing commitments from multiple shoppers. Shoppers are often "soft" or fickle in their commitments, and tend to be lured away by outside sellers offering similar deals. Second is the decision of the sellers to reveal pricing information, which is dependent on the shoppers' changing commitments.

Therefore, various commitment schemes, many if not all of which have already been tried by businesses, are either too soft, which makes life hard on a seller; or too hard, which makes life harder on a shopper.

What is needed is a group buying method that is effective in letting a seller and a group of buyers agree on a price, without being hindered by the fickleness of buyers' commitments as seen in practice, or by sellers' reluctance in revealing too much pricing information.

This techniques disclosed herein address a sweet spot for market-making from an informational point of view. Namely, the method facilitates a (spontaneous) group of shoppers and a seller to meet at a price, while striking a balance between sellers' revealing price information and shoppers' commitments. The disclosed subject matter provides a method by which sellers need reveal only necessary price information; the subject matter also allows for shoppers to form groups in which they are free from commitments to each other and to potential sellers.

SUMMARY OF THE INVENTION

The present invention provides apparatus, systems and methods in which prices for a bundle of items can be established. In one aspect of the inventive subject matter, information is collected regarding the member items of a bundle. Information regarding the criticality (e.g., must have, nice to have, not necessary, etc.) of a member items is obtained preferably through an electronic interface (e.g., web page, API, web service, etc.). Sub-bundles having various combinations of member items can be identify where each of the sub-bundles preferably includes at least one common member item and possibly includes alternative items that have not been selected by the user. Prices for new versions of the bundles can be determined and presented to the user along with member items of the new versions of the bundles.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 3 is a mockup of a preferred "Shopping Pricing and Negotiation Console".

FIG. 4 is a mockup of a preferred "myCatalogue".

FIG. 6 is a mockup of a preferred person-price chart from a seller.

FIG. 11 is a collection of graphics the show coupling of items in a basket, depicted through a user interface.

DETAILED DESCRIPTION

Figure 1:
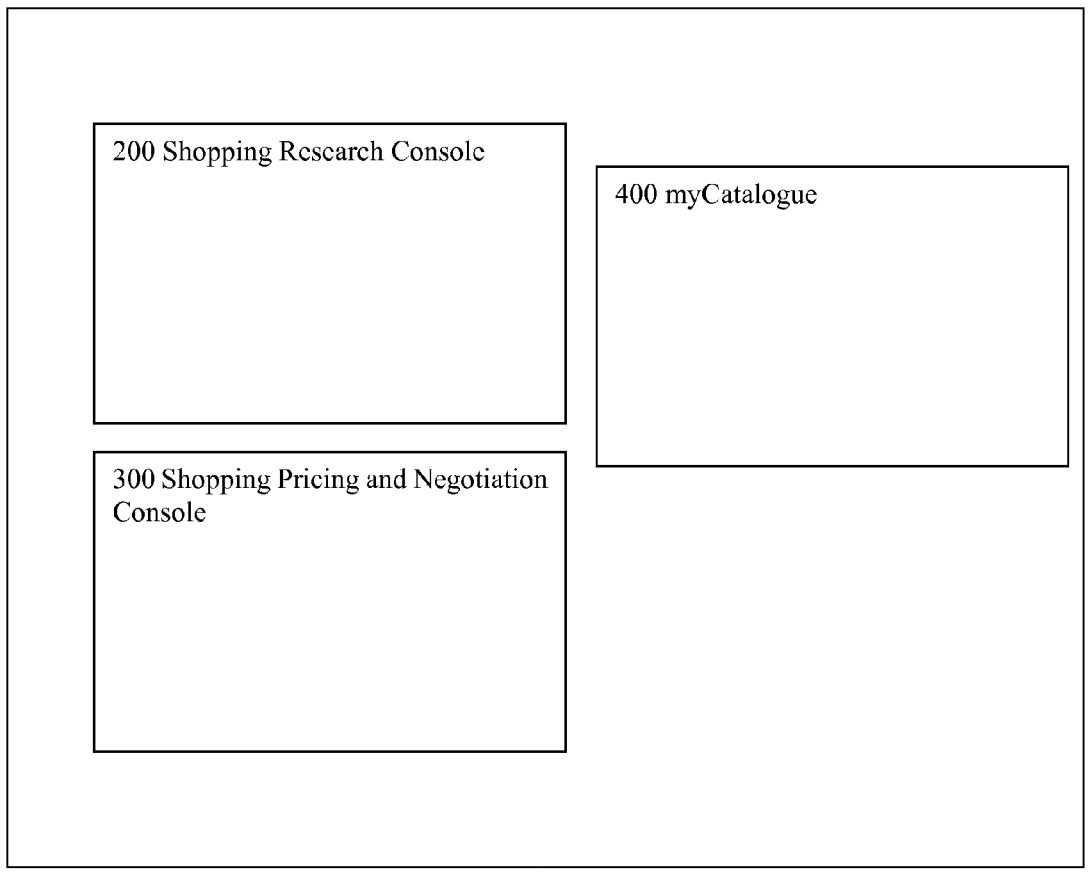
FIG. 1 is a mockup of a preferred "Shopping Console".

Bundled purchasing is a good model of purchasing behavior since it is often the case that people need to buy more than one item at a time. It is surprising that this need is not being met conveniently at present. Moreover, it is clear that considerable savings can be extracted from bundled purchasing, as very sophisticated buyers often uncover incredible deals for bundled products. Bundled purchasing is common among individual shoppers as well as those who are willing to band together. Further, bundled purchasing is a fitting description of how enterprises make purchases, as in a purchase order such as "40 PCs, 41 power strips, 42 LCD screens, 1000 envelopes."

One contemplated example is where a buyer wants to purchase a digital camera and memory card. What she's interested in is called a "natural" bundle. There are many natural bundles, and many stores offer them as "bundles", "packages", and "kits". Another contemplated example is where a shopper is interested in buying both a digital camera and a wide-screen TV. What she's interested in is called an "uncommon" bundle by this document. There are many examples of "uncommon bundles", such as a family's grocery shopping list or an individual's Christmas gift list. Still a third contemplated example involves a wedding registry, with the products viewed as a bundle, and the purchased items decided by a "mob"; namely, those invited to the registry who have made purchases. Such a bundle is called a "mob bundle" by this document. Many life events correspond to bundles, and following are examples: (i) a group of mothers buying for similar-aged schoolers; (ii) buying for graduation; (iii) bridesmaid dresses; (iv) back-to-school; (v) fitting a crib and purchasing similar products for a new baby.

Using these examples as guides, one can think of an infinite number of bundles relevant to various aspects of the inventive subject matter, including those listed below.

a. Digital cameras: Memory card, Extra battery, Case, Card reader, Tripod, and cleaning kit b. Laptop computers: Printer, Screen, Extra power cords, Extra batteries, and Case c. Cell phones: Extra battery, Extra charger, Car charger, Belt mount, Case, and Memory card d. Family skiing equipment: For each person: Skis, Poles, Boots, Jacket, Helmet, Gloves, Ski jacket, Goggles, Sunblock, and Ski cap e. Any other sporting equipment, (e.g., biking, hiking, hunting, etc.)

f. Child going off to college: Bedding, Coffee maker, Microwave, Desk accessories, and Table lamp g. Leaving home to set up an apartment: All of college above plus Bedroom set, Kitchen set, Living room set, Dishes, Linens, TV h. New baby furnishings: Crib, Clothes, layette, Creams, High chair, Child car seat, Child carrier like backpack, etc.

i. Vitamins: "continuum" quantities, namely a shopper can decide to purchase two bottles or three bottles, 100 tablets or 150 tablets during one shopping occasion; Not sensitive to brand names; Reoccurring.

Additional bundles can be discovered by data mining. It is contemplated that one can utilize a "Markov Description of Product Relationships". The method works first by constructing a Markov chain whose nodes represent products. By computations performed on the resultant Markov chain, relationships among products are discovered. Such relationships are used in further deducing of bundles of products.

An individual bundle is considered to fall somewhere on a continuous spectrum of bundles where one end of the spectrum represents a tight coupling of highly related items forming a product and where the other end of the spectrum represents a loose collection of unrelated items.

The extent of the coupling of at least two items could be a function of some of the following factors: (1) whether the items are physically joined; (2) whether the items are electronically and/or magnetically joined; (3) whether the items share at least one common interface.

Coupling of at least two items can vary in degrees of exclusivity. For example, AA batteries couple with many electronics, while brand name lithium-ion batteries many times couple only with few kinds of electronics.

An example of a tight coupling of highly related items forming a product includes a bicycle comprising many items including wheels, tires, brakes, gears, spokes, or other items. An example of a loose collection of unrelated items includes a basket of groceries or sundries. As used herein a "bundle" is considered to be one of the following types of bundles:

(1) A "product bundle" where items composing the bundle are a prior physically joined or assembled (e.g., a bicycle, computer, camera, etc.)

(2) A "functional bundle" where items composing the bundle are functionally related and can be joined via common, standardized interfaces (e.g., A camera and a third party memory card, a game console and a game, a software application with a plug-in module, LEGO™ blocks, a gift basket, a set of clothes for a baby shower, etc.)

(3) A "loose bundle" where items are neither physically joined nor functionally related (e.g., a grocery bag of items, an online shopping cart of disparate items, etc.)

It is also contemplated that coupons, discounts, rebates, or general promotions are bundles. A promotion is coupled with a specific product, or a class of products, or all products sold at particular stores. A promotion typically has an effective period of time. A promotion sometime can be used in conjunction with another promotion. A promotion typically has monetary savings to a shopper. Such savings might be immediate (e.g., "$10 off at check out"), or not (e.g., "$1 off for your next purchase of this product"); could be of definitive dollar figures (e.g., "$10 off on any purchase"), or not definitive (e.g., "free shipping if total purchase is over $25").

A bundle often has one "major" item. Such an item typically is at the center of coupling. For example, consider a bundle of a digital camera, a memory card, and a case. The digital camera is the major item in such a bundle. The memory card needs to be compatible with the digital camera, so does the case. And it is typically less important whether the memory card is compatible with the case (e.g., that there is a pouch in the case for holding the memory card.) It is contemplated that a bundle can be varied using pair-wise combinations of items within a bundle. For example, a memory card could be varied while holding the camera fixed. Additionally, a case could be varied while holding the camera fixed.

(A) Bin Packing Methods with Approximate Membership

Given a set of items I, and a listing T of tuples of {{items}, price, seller ID}, where a set of {items} typically is a subset of I, but could include items that are not in I. Find a subset of T, so that the union of sets of {items} "approximate" the set I, and the combination of the union, and the total price, is "good". A solution is called a "purchasing solution" for a buyer who is interested in the set I.

The necessity of an approximate membership is revealed by daily purchasing experiences. For example, it is not uncommon for a bundle of multiple types of insurances (auto and renter, for example) to be cheaper than one of its component items. Similarly, it is not uncommon for a bundle of item A and item B to be acceptable to a buyer who has initially expressed interest in item A. Also, superadditivity is present when at least one of the conditions is met: (1) tax is dependent only on values and location of purchase; (2) shipping is dependent only on weight of the total shipment.

A greedy algorithm is contemplated as follows:

(1) find from T the largest set S_1 of {items};
(2) find S_1's "component price" as follows:
    (2.1) find the largest set S_2 of {items} that is a subset of S_1;
    (2.2) find S_2's component price;
    (2.3) S_1's "component price" is the sum of (a) S_2's " accepted price", and (b) (Not S_2)'s "accepted price";
(3) return S_1's "accepted price" as the lower of (i) S_1's given (bundled) price, and (ii) S_1's component price;
(4) I's accepted price is the sum of (i) S_1's accepted price, and (ii) (NOT S_1)'s accepted price;

Another greedy algorithm is contemplated as follows: (I) given a major item and other items, go through the list of stores that offer this major item, and take the following two steps: (a) find all other items the store sells, including a package that dominates; (b) do a "union" on the rest of the items; (II) find the "union" price; (III) find the minimum of prices found in (I) and (II). An algorithm similar to the above is expressed as follows:

(1) given a list of items;
(2) given also each seller's bundles, prices, etc.
(3) find a largest subset of the list that matches a bundle by sellers
(4) decide whether this "sub-bundle" is "reasonable"
    (4.1) calculate the cost of adding up each item;
    (4.2) calculate the cost of adding up "well known" bundles and remaining individual items;
(5) if the sub-bundle is reasonable, remove it from further consideration. And work on the rest of the bundle.
(6) if the sub-bundle is not reasonable, start with at least one "well-known" bundle, and repeat the process.

A purchasing solution can be further improved by auctioning it to multiple sellers. With a contemplated auctioning, at each round of pricing shown above, the resultant purchasing solution is presented to participating sellers, who can choose to bid manually in real time or not, or to bid via software set up a priori with the system, which is a preferred embodiment.

(B) "Shopping Console"

FIG. 1 depicts the "Shopping Console", a user interface that includes the "Shopping Research Console" 200, the "Shopping Pricing and Negotiation Console" (also known as the "Shopping Puzzle Board") 300, and the "myCatalogue" 400 that keeps track of purchases.

Figure 2:
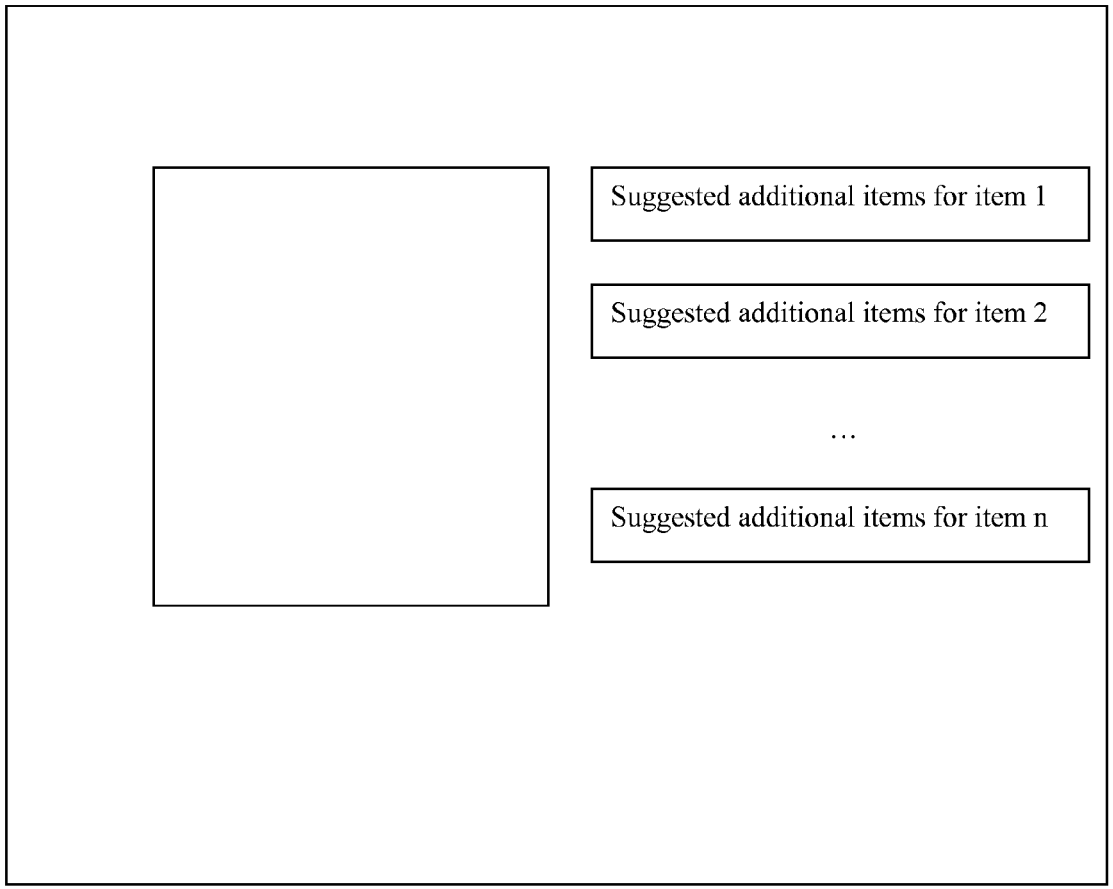
FIG. 2 is a mockup of a preferred "Shopping Research Console".

With a preferred embodiment, a shopper uses the "Shopping Research Console", referring to FIG. 2, in order to research items to be shopped in an orderly and convenient way. In addition to that, the information collected during the process is used in a latter stage of the shopper's shopping activities, such as during the pricing or negotiation stage. With a preferred embodiment, a buyer enlivens a shopping console by putting forward a list of items to be purchased 210. On the console, suggested items 220 are shown to the user, who can decide whether to take up such suggestions. For example, the SKU of the shopper's purchased digital camera will prompt the console to suggest memory sticks, batteries, and other accessories that complement the camera. Similarly, the console could suggest pre-packaged kits available from stores that are supersets of the items initially input by the user.

Once the user completes her research stage, with or without the help of the Shopping Research Console, the Shopping Pricing and Negotiation Console, an embodiment of which is depicted in FIG. 3, could be enlivened. She has so far decided on the item or items 310 to purchase, each item preferably with its SKU; it is also contemplated that an item could be a bundle by itself. Typically a row corresponds to an item. Rows, columns and cells could be color coded.

On the console, each item is associated with specifications 320 that include prices as well as information intrinsic to the item. Each item is also associated with purchasing attributes 330 that are intrinsic to purchasing, including price acceptance measure (e.g., "to pay $X at most", "acceptable at $Y"), store choice (e.g., "acceptable stores", "not from dinky-electrn.com", etc.), measure of desirability (e.g., "must have", "OK to have", etc.), transactional attributes (e.g., "at most 3 shipments"). Directives 340 include negotiation directives (e.g., "accept", "negotiate", "drop item", "add item", etc.), and general directives (e.g., "accept", "abandon", "pause", etc.).

The buyer issues negotiation directives and general directives, and drives the purchasing. At any moment, the buyer can choose to commit to purchasing any of the items. An important parameter for the buyer to decide is up to how many shipments the buyer wants, reminiscent of how many stops a flight should have. When the buyer waits for computation results to come back from the system, the system would display some of the intermediate results or their statistics, to keep the buyer informed of progress. The console also includes an area for keeping a history of a buyer's researched items.

There is a natural progression in the sophistication of the user interface to a shopper. Four are listed below:

(1) Just go to a site and allow the shopper to specify the extras they want (perhaps with suggestions from methods of the inventive subject matter as to which are essential) and then get a package price from that vendor using an algorithm the seller has given to apparatuses associated with the inventive subject matter. This would somehow "hijack" a supplier's site with a wrapper create by an apparatus within the scope of the inventive subject matter and give this value added service to the shopper. It would require the cooperation of the supplier.

(2) The next step in the progression would start from a site contemplated as a preferred embodiment, and ask the shopper to create the package he wants by clicking against a list of accessories he wants to add to the major item (e.g., the camera). The site would then go out to many suppliers and get the full package price from each and give the user the best among those suppliers.

(3) The third step in the progression is to go to each site that can provide the major item (e.g., the camera) and form the largest package available from each site; then, for each partial package, the site goes to all other sites that can supply the rest, or perhaps collect the union of cheapest ways to complete the package from many suppliers. The site would then present the best of these combinations. Note that this is a heuristic with controllable complexity since methods falling within the bounds of the inventive subject matter can decide how many of the "missing" accessories to try to fill as a sub-package at each of the "non-prime" sites.

(4) The fourth step in the progression allows the shopper to add his own other items to the bundle. So, for example, if a buyer wants to buy a camera and is offered by the site a list of "natural" accessories, then he can identify other items from the site (he would have to search for them somehow) that he wants to add to his purchase, such as a USB Hub or some other relatively or completely unrelated item. Once he does that, the site can proceed in exactly the same was as it does for the first product (i.e., only return pricing from sites that have all the items in the bundle); in this case, the supplier's algorithm might or might not do any better than just add the cost of this unnatural item (or it might actually do better because of their more sophisticated algorithms or because the algorithm gives discounts as the total size of the purchase goes up).

This last point introduces another feature the site can add, namely, if the supplier gives a 10% discount once the order exceeds $500, and the package comes in at, say, $480, then the site can suggest that the buyer include some other natural item to his bundle (one that he did not request) and get a better overall price with more goods (e.g., suppose the extra item costs $30–then his total price is $510 less $51=$461 giving a savings of $19 AND he gets the extra item).

Referring to FIG. 4, once a purchase is completed, activities associated with the purchase can be stored and managed by the myCatalogue user interface. On the interface, the status of items 410 is kept. Specifications 420 contain each item's specifications. Confirmation 430 could be "confirmation received", "confirmation not received", etc. Shipping 440 could state whether the item has been shipped, as well as the arrival date. Rebates 450 contains the status on rebates, e.g., "rebate mailed", "rebate fulfilled". The interface can also check the status of a rebate by regularly logging on to certain sites that have such information.

Information is input to myCatalogue in various ways. First, a user can manually input. Second, stores cooperating with the site could give sales transaction information to the site, which would in turn feed it to a shopper's copy of myCatalogue. Third, confirmation information from stores not in cooperation with the site could be fed to myCatalogue, which automatically recognizes the products, confirmation numbers, and other information.

Referring to FIG. 11 which depicts the "coupling" of sub-bundles and its components. Suppose a shopper wants to get a camera, a card, a case, and a cleaning kit. If the shopper picks "B0_1 ", which includes a camera and a card, then the section on the interface displaying information for cards is grayed out. Similar, if the shopper specified a "B_-1", which includes a case and a cleaning kit, then the section for cases, and the section for cleaning kits are grayed out.

(C) "Flash Mob Shopping" in Group Buying

The inventive subject also includes the concept of allowing sellers and a (spontaneous) group of shoppers to interact, thus the name "Flash Mob Shopping". It has been recognized that shoppers benefit if they are able to band together. Within a preferred embodiment, the site acts as a facilitator so that shoppers can organize themselves around a shared interest in purchasing, and present themselves as a group to sellers. The site provides interfaces so that shoppers can synchronize on pricing, commitments, timing of purchasing, etc. Typically, the better synchronized they are, the greater benefits they can achieve. Shoppers could be consumers or small-to-medium enterprises.

A preferred embodiment connects sellers and shoppers on prices without shoppers' hard commitments, and with sellers revealing only necessary price information.

Consider two difficulties that hinder an effective solution to group buying: one associated with shoppers, and the other with sellers. The group buying situation is effectively a reverse auction concatenated with an offer from a group instead of an individual. With group buying, a group of shoppers post something to be bid by at least one seller among which the one who offers the lowest price wins the bid. Compared to time-test auctions on eBay, there are two practical difficulties with reverse auction and its concatenation with shopping groups: the first is that shoppers' commitments are soft or fickle, certainly softer than a seller on eBay, and may easily be influenced by an outside seller offering a similar deal. Also, multiple shoppers will need to reach a consensus on their degree of commitment, which could prove to be challenging. The second difficulty is that sellers have to decide what kind of price information to reveal because of possible drops in commitments.

A preferred embodiment addresses a sweet spot for market-making from an informational point of view, namely a method can facilitate a (spontaneous) group of shoppers and a seller to meet at a price, while striking a balance between the seller's reluctance in revealing unnecessary price information and the shoppers' reluctance in committing. Preferably a method is provided to sellers so that they reveal only necessary price information; also a method is provided to shoppers so that a group can be easily formed without the members have to have heavy commitments to each other, or to the sellers, or anyone else.

With this document, we call a group of buyers a "flash mob for shopping", or a simply a "mob".

(C.1) The User Interface of a Mob

Figure 5:
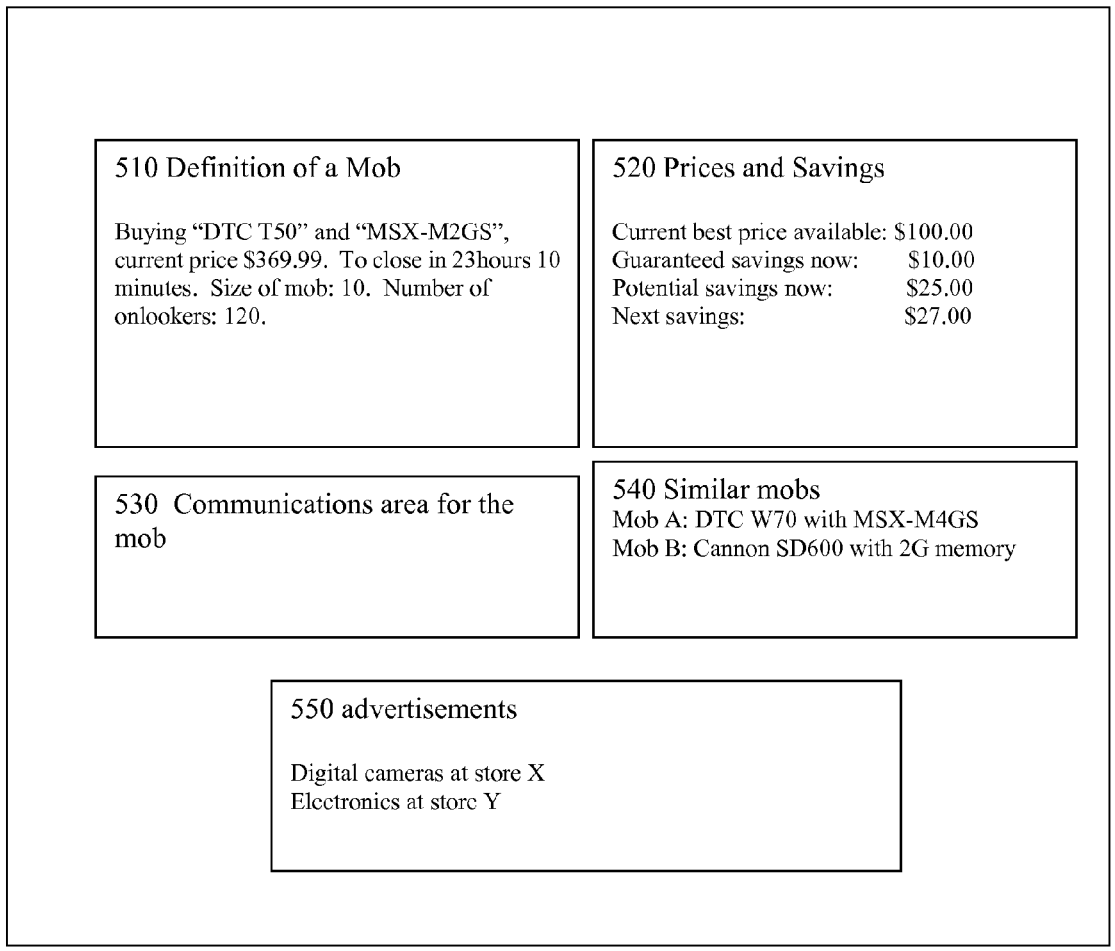
FIG. 5 is a mockup of a preferred interface to a flash mob for shopping

Referring to FIG. 5, which depicts the contemplated user interface of a mob. The following items are main areas of the interface:

(1) The area for the definition of a mob 510. The definition of a mob includes but is not limited to: (i) the product or products to be purchased; (ii) exactness in product specifications, namely a high exactness requires the use of an SKU for each product, and a low exactness could be a natural language expression such as "holiday gifts under $20 for a 10-year old boy"; (iii) the price that is acceptable to members of the mob; (iv) the lowest price that the system is able to find at the moment; (v) the number of people who have committed to purchasing; (vi) the number of people who have got in the queue, indicating a strong interest in buying; (vii) the number of people who are onlookers; (vii) the age of the mob and remaining time to close.

(2) The area for presenting prices and savings 520. In this area, the current best available price is shown to shoppers. If at least two shoppers have committed to the purchasing, then "guaranteed savings" shows the savings due to the grouped purchase from at least one seller. The "potential savings" shows the savings to be gained if additional mob members commit to the purchasing. The "next savings" shows the savings to be gained if one more shopper joins the mob. A shopper could be shown both the "net" price (after rebates, discounts, etc.) and the final price (after shipping, tax, etc.). Optionally, the store name is displayed.

(3) The area for mob members to communicate with each other 530. In general, this area is not unlike online forums, chat rooms, and blogs.

(4) The area for showing mobs that are similar to the current, chosen mob 540. Similarity could be measured by a number of factors, including but not limited to (i) the product or products being purchased; (ii) the identifiers of shoppers in a mob when such identifiers are available.

(5) The area for advertisements 550. Typically, such advertisements will match the product or products the mob is purchasing.

(C.2) Commitment of a Shopper

By joining a mob, a shopper expresses an interest in buying the product or products that are associated with the mob. With a preferred embodiment, there is no expectation for the shopper to commit to purchasing at the current price. With another embodiment, upon joining the queue, the shopper can choose to give her credit card information, and is committed to purchase if the price is at or below the current price It is contemplated that those who commit before others will receive incentives for doing so, and that the site will track the shopper's behavior with respect to keeping commitments so as to generate "social pressure" that will help to reduce drop-outs.

(C.3) Pricing Information from Sellers

Referring to FIG. 6, which depicts a contemplated way for a seller to give price information in relation to the number of interested shoppers. The seller gives the site a person-price chart, initially providing only the first several entries. With the particular chart in the figure, the seller indicates that the price is $299 when there is only one in the mob; $289 for each shopper when there are two in the mob; $275 for three; and $250 for four. The prices beyond four at the moment are yet to be revealed. When the mob grows further, the site communicates the increased size to the seller, and the seller can then choose to reveal more pricing information to the site which in turn will be revealed to the shoppers.

Pricing information and when to reveal it is upon the stores. Some possibilities are contemplated: (i) as a function of the number of shoppers, or of the total dollar amount, thus effectively revealing the entire pricing information at one shot; (ii) gradual revelations depending on the size of the mob, with the store deciding on whether the size of the mob corresponds directly to the "number of shoppers" in the chart. In other words, when a store is informed that a mob has ten members, it might expect the final number of shoppers to be six, and will only reveal prices up to six shoppers.

(C.4) Mob Dynamics

A mob goes through three stages: (1) creation; (2) evolution; and (3) conversion. Dynamics of each of the stages are contemplated below.

(C.4.1) Mob Dynamics: the Creation Stage

Anyone can start a mob, by filing out the needed definition for a mob. Once a shopper joins the queue expressing an interest in purchasing, the mob is said to have been created. How a mob could be defined has been discussed above.

(C.4.2) Mob Dynamics: the Evolution Stage

Once a mob is created, it enters its evaluation stage. When this stage completes and how is contained in the definition of the mob. Some of the dynamic involved are contemplated as below.

During this stage, shoppers join or drop out the mob; meanwhile, participating stores (namely those stores having a prior agreement with the site in supplying pricing information) which are interested in selling to the mob could change its price-person chart.

Members of a mob (namely those in the queue associated with the mob) can communicate with each other through communication mechanisms provided by the site, such as forums, emails, blogs, text messaging, and chat rooms. Also during this stage, stores not participating could happen to have the same item or items for sale at a cheaper price. Such information is available to anyone who conducts a search on the site. In other words, such a store can undercut a mob's cohesiveness by coming during this evolution stage with a very attractive price.

A mob could change into another mob, and sometimes split into more than one new mob, when some of the following components of the definition of the mob change: (i) the item or items to be purchased; (ii) the accepted price; (iii) the closing time of the mob.

A mob could also split because a subset of its members decides to commit to purchasing. This subset of the mob members would accept a price that corresponds to the size of the subset, and start purchase transactions.

Two mobs might merge into one. One contemplated possibility is that one mob's item or items to purchase are a super set of another mob's, and at a lower price. The site constantly brings to shoppers' attention those mobs similar to their mob.

(C.4) Mob Dynamics: the Transaction Stage

According to a condition stipulated by the mob's definition, the mob's transaction stage starts once the evolution stage is completed.

A preferred embodiment is described as follows.

(1) The identifiers of the mob members are up for sale to participating stores. If no store is interested, the mob members are notified and given instructions on the best, most relevant deals the site can find.

(2) When the list is purchased by a single store, the mob members are notified by the site to come to an area operated by the site that is devoted to the transaction stage. The purpose of this area is for mob members to give enough information to the store so that sales can be completed. According to one preferred embodiment, a mob member fills out information and gives out payment information to the site; the site communicates the information to the store, which creates a hold on each credit card (other payment methods would have an equivalent approach to hold), and by a specified amount of time (e.g., 4 hours), the transaction stage closes. The final price is a result of the number of mob members who have finalized payments with the store. The store then proceeds to charge the correct amount. With another embodiment, all other aspects remain the same as above, except that mob members give information directly to the store.

(3) When the list is purchased by more than one store, due to the first store failing to supply sales to all mob members (for example, the first store has five items in stock when there are nine mob members and therefore nine items needed), a second store is needed to step in to satisfy the mob. The implementation of this conversation stage is similar to above, except that different members of the mob might be directed to different areas.

(4) When the list must be purchased by more than one store (for example, when there are six items in the bundle, but no store has all six items), a preferred embodiment is contemplated as follows. The site sets up an area dedicated to all the stores and the mob members all log into the area, which can be described as a "walled garden". Mob members are presented with a "jump page" where payment information is obtained and passed on to each store, along with details of the products to be purchased and the payment amounts associated with each store. It is further contemplated that if a mob member has a registered account with the site, and has stored information in the account; such information could be supplied automatically to the jump page. In addition, if stores are willing to carbon copy the site sale confirmations, shoppers can benefit by keeping better track of their transactions. In a preferred embodiment, such information would be fed to the shopper's "myCatalogue" interface.

(5) During the transaction stage, the site acts as an intermediary that helps to maintain the honesty of both shoppers and sellers. In a preferred embodiment, a store agrees to carbon copy sales confirmation information to the site. The site thus has a tally of successful transactions, and can double check whether the store indeed charges each shopper according to the person-price chart it has revealed. In turn, the shopper agrees to inform the site if she has shared her credit card information with the seller, allowing the site to know how many transactions are supposed to take place. Therefore, in the case of a discrepancy between the store's view of the transactions and the aggregated shoppers' views, the site can determine which party has not behaved as expected.

(D) A Finer Model for "Store-wide" Discounts

A seller, such as TigerDirect, could issue discounts specific to the site, partially depending on shoppers' activities fed by the site to the seller.

Figure 7:
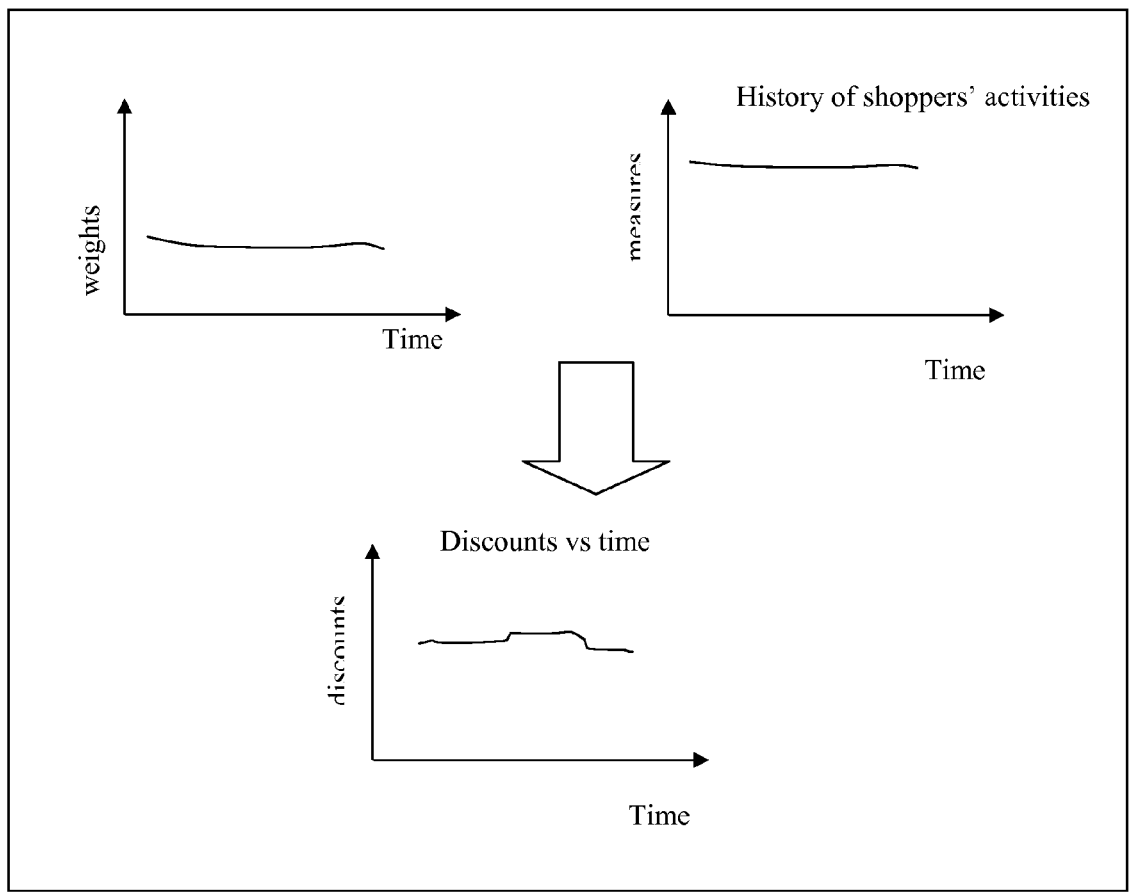
FIG. 7 is a chart showing convolution of a weight function and an activity history.

Referring to FIG. 7, one preferred embodiment of calculating the discounts depending on shoppers' activities is a convolution between a weight function and a history of shoppers' activities. For example, if the sites delivers $W sales and X number of leads and Y clicks to a seller over recent Z days, a 10% discount could be issued to every shopper who goes to the seller through the site. Such a "general discount" is in addition to product-specific discounts that the site might issue to shoppers.

Once combined, these two discounts help sellers to evaluate the site against other sites that feed traffic to the seller, and also help the site to select winners among sellers.

One aspect of the inventive subject matter comprises a method for a store to assign an instant discount percentage to a shopper that visits the site: (1) the store giving the site a discount table, with a preferred embodiment, such a table has N rows; where the i-th row contains the discount percentage corresponding to a sales volume expressed as i; (2) the K-th shopper who has done purchasing gets the discount percentage in the K-th row; (3) the (K+1)-th shopper is expected to get the discount percentage in the (K+1)-th row. Further, a sale volume could be the total of sales activities in a period of time, e.g., past 30 days.

(E) Enjoying the Benefits of Group Buying without Forming Flash Mobs

It is contemplated that benefits of group buying do not require forming "flash mobs": when a shopper comes to the site, she decides on the item(s) to purchase; the site calculates a discount partially based on statistics of shopping activities associated with the item(s) during the last K days (e.g., 30 days). Such shopping activities could include purchases, expressions of interest, viewing of prices, etc. The statistics could be for an individual store, or for at least two stores. It is further contemplated that a flash mob member can benefit both from shopping activities on the site in the past, as outline above, as well as from shopping activities on the site in the future.

Figure 8:
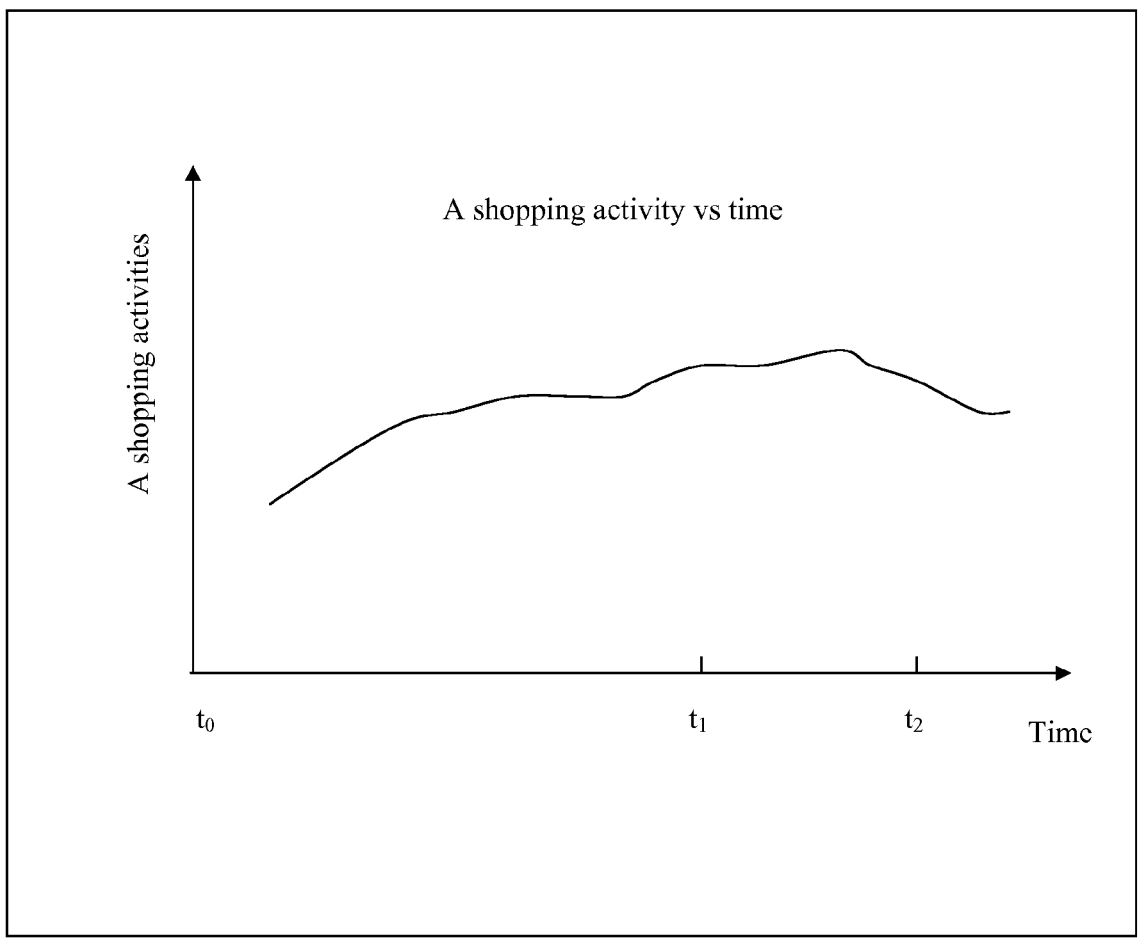
FIG. 8 is a graph showing computation of a discount for an individual shopper.

Refer to FIG. 8, which depicts a chart of a particular kind of shopping activity (e.g., the total dollar amount of an item being purchased by visitors to the site). A shopper performs a shopping activity (e.g., clicking on the image of a digital camera) at time $t\_1$. An instant discount for the shopper could be computed based on the shopping activity shown on the chart between $t\_0$ and $t\_1$. The choice of $t\_0$ could be a fixed date and time, or a moving window so that $t\_1$ is always K days from $t\_0$. Further, an additional discount could be computed for the shopper at $t\_2$, based on the shopping activity shown on the chart between $t\_1$ and $t\_2$. The choice of $t\_2$ could be done with various methods, such as a fixed date and time, a moving window as explained earlier. Still further, charts for additional shopping activities could be constructed and used to compute the discount for this individual shopper.

(F) Gradually Enticing Shoppers to Register with the Site

In order to attract as many people to the site as possible, heavy commitments should not be initially required from them.

For onlookers, a "registration" could be as simple as picking a user id and inputting a zip code, with no password required. To keep track of visitors to the site with such a registration, various techniques could be applied, such as cookies.

For those wanting a "shallow" account with the site, the zip code, user id, and a password would be required from the user.

Various information would be sent to such an account, such as search histories, intentions of purchasing certain products, alerts from the site, communication from other shoppers, and communication from sellers.

For those wanting convenience in conducting purchase transactions, further information would be required from a user, such as address information and credit card information (with the options of one-time use and storing in the account). Further, software such as "myCatalogue" is typically associated with such an account.

(G) Depths of Cooperation Between a Store and the Site

A store does not need to be cooperating with the site while still being fed traffic from the site. With different depths of cooperation between a store and the site, both will benefit. Possible cooperation preferences are outlined below.

(1) Participating in the pricing and auctioning stage. When a shopper uses the Shopping Pricing and Auctioning Console, auctioning is conducted among participating sellers. A seller could use software that is installed with the site a priori, or could participate in the auction manually.

(2) Participating in flash mob shopping. A store reveals its person-price charts to the site, which is used in flash mob shopping.

(3) Cooperating in the conversation stage of flash mob shopping, in which the store receives information filled out by a shopper on the site, and preferably sends sales confirmations to the site.

(4) Cooperating in issuing discounts to specific shoppers to the site. Such discounts are used by shoppers visiting the site. Such discounts could be sent directly to a shopper's account on the site, and tailored for the shopper.

(H) Search for "Complex Information Entities"

Another aspect of the inventive subject matter considers the current Web search technology searches "simple information entities". A "simple information entity" conceptually is a list of words that represents contents of a Web page.

"Complex information entities" better models information that exists in the real world, such as in retailing. A product has various features; as does a coupon, a bundled product, a discount, a deal, respectively.

With searching capability for complex information entities, flow of information in shopping will be altered, as discussed below.

Figure 9:
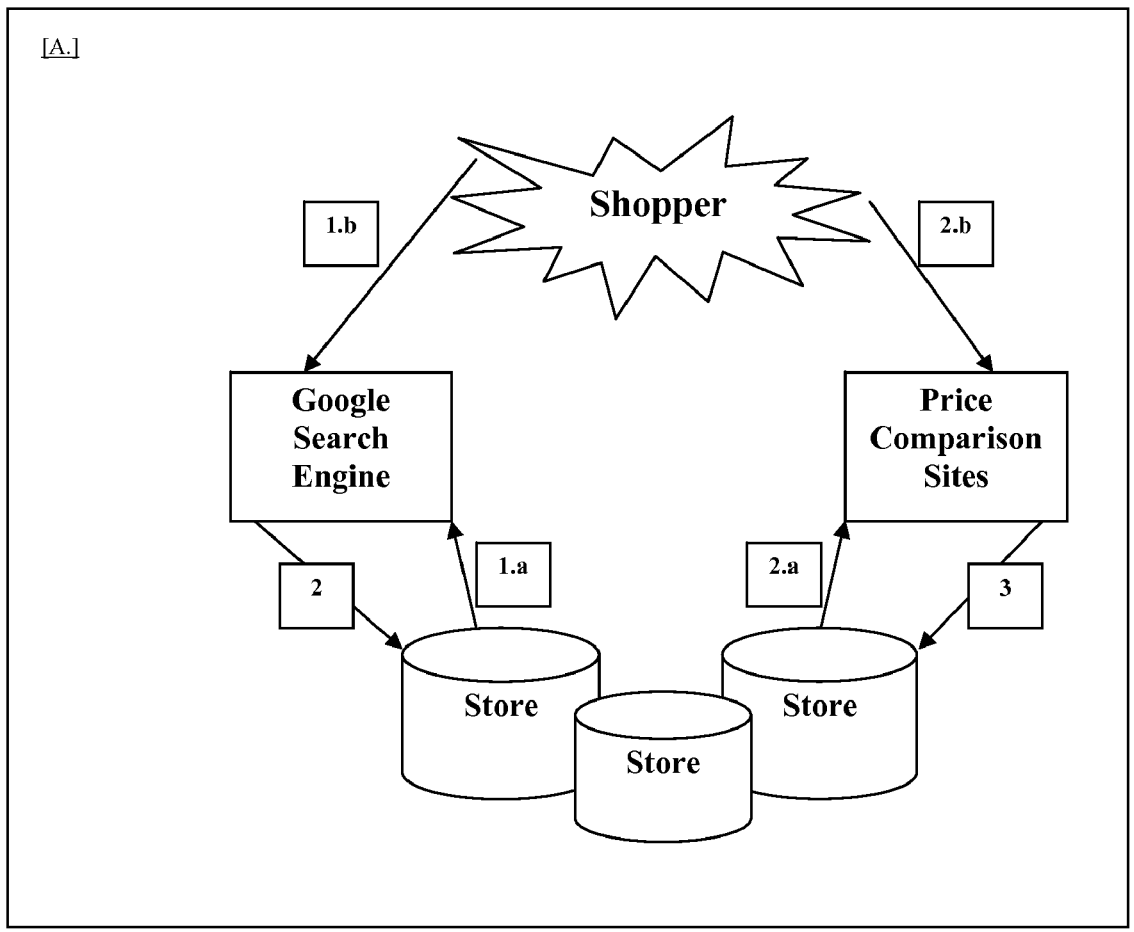
FIG. 9 is a flowchart showing the flow of shopping information to a shopper.

Refer to FIG. 9, which is a depiction of how shopping information flows in the current Web. At Step (1.a), a store publishes info on the Web; at Step (1.b) a shopper searches on Google. At Step (2) the store's page appears on Google's organic search results, the shopper clicks and is led to the store; at Step (2.a) a store submits its product info to a price comparison shopping site; at Step (2.b) a shopper browses or searches on a price comparison shopping site. And at Step (3) the shopper clicks on a link, and is led to the store's page. Information that flows through Google includes product names, etc., but not much beyond this, and does not include price information. Information that flows through price comparison sites includes products and their prices.

Figure 10:
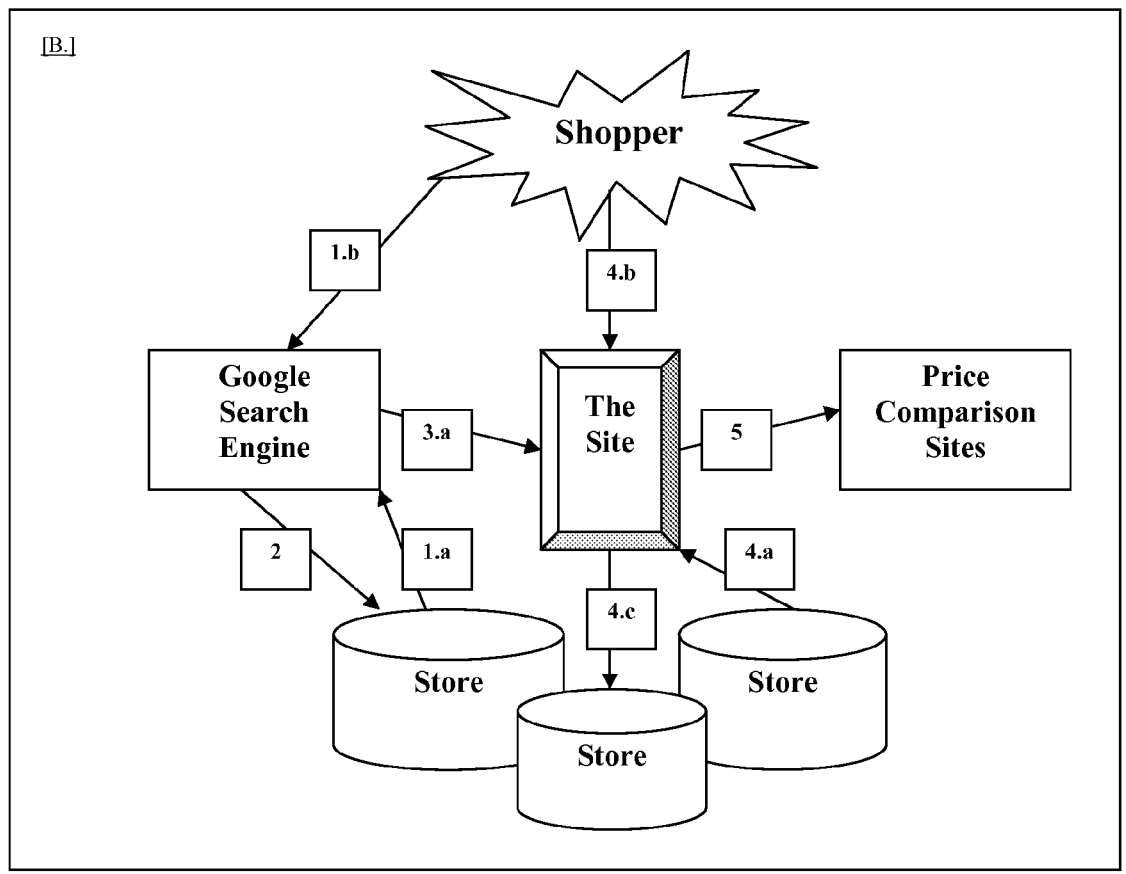
FIG. 10 is a flowchart showing the flow of shopping information once the site starts to work.

Refer to FIG. 10, which depicts how shopping information flow is altered once the site, a preferred embodiment, starts to work. The site attempts to create an information blanket. Because of the new approach, complex information (e.g. bundles, deals, discounts, etc.) flows in the information landscape. Information flow contains various steps as described below:

(1.a) a store publishes information on the Web
(1.b) a shopper searches on Google
(2) the shopper clicks and is led to the store
(3.a) the site's pages are registered high on Google's results page, leading the shopper to the site
(3.b) the shopper is further led to the store
(4.a) a store publishes its info on the Web, oftentimes submitting its information to the site
(4.b) a shopper searches or browses on the site
(4.c) the shopper clicks and is led to the store
(5) a shopper searches or browses on a price comparison shopping site (I) "Doubly Indexed Attribute-value Paris"

Preferred embodiments, utilizing an indexing method that enables searching of complex information entities.

A. The current practice

[A.1] The utility: exact matching and proximity search

[A.2] The implementation

[A.2.1] Forward indexing

[A.2.1.1] Forward indexing, conceptual step 1, given a web page

[A.2.1.2] Forward indexing, conceptual step 2: replace sections of words with their IDs

[A.2.1.3] Forward indexing, conceptual step 3: segment positions from 0 . . . MAX_POSITION, so that each segment corresponds to a section. Therefore, the forward indexing of a doc becomes a set of pairs of (word, positions)

[A.2.2] Inverted indexing, given a set of forward indexes, with each forward index corresponding to a document (typically a web page)

[A.2.2.1] The inverted indexing produces a mapping: word_id □ a set of tuples of (document, id, a set of positions) for efficiency; typically, each set is further turned into a sorted list

[A.2.3] Matching

[A.2.3.1] Given a query, express it as a sorted list of (word, id); sort by position in the query

[A.2.3.2] Given one word_id, look up the inverted index, retrieve (word_id)□{(doc_id, {position}), and calculate the extent of matching for each doc_id. Typically, the section indicated by a position carries a certain weight, and different sections typically have different weights

[A.2.3.3] Given two word_ids, look up the inverted index, retrieve for each word_id, and find doc_ids that contain both word_ids. For such a doc_id, calculate the extent of matching: a.) the distance, order of the two word_ids for such a doc_id, with the doc leading to different extents of matching; b.) sections are dealt with in a manner unlike above

[A.2.3.4] Given more than two word_ids, make needed changes to [A.2.3.3]

[B] Doubly indexed attributes and values (A butterfly-like indexing)

[B.1] The utility: an efficient way of doing any of the following:

(i) blending database search and free text web search
(ii) implementing a relational database whose fields are not defined a priori
(iii) searching information arranged hierarchically, such as in a directory

[B.2] Implementation

[B.2.1] Forward indexing, given a "doc"

[B.2.1.1] Forward indexing, conceptual step 1: a mapping {a set of (attribute, word, position)}□{a set of (value, word, position)}

[B.2.1.2] Forward indexing, conceptual step 2: replacing words with their ids

[B.2.1.3] Forward indexing, conceptual step 3: segment positions, so that a mapping from a position to whether a word is a value_word or an attribute_word is known—so that a doc is represented by a set of (word_id, position)

[B.2.2] Inverted indexing: same as [A.2.2]

[B.2.3] Matching (i) given a query, parse it so that it's a sorted list of tuples of {(attribute_word, attribute_word, . . . , value_word, value_word)}

(ii) given one tuple, calculate the matching in a way not unlike [A.2.3.3] or [A.2.3.4]

(iii) given more than one tuple, calculate the matching in a way not unlike [A.2.3.4]

(J) Additional Concepts

One should note that the inventive subject matter is also considered to include the additional concepts presented below.

(J.1) Shopping Console

Some embodiments include a shopping console interface allowing individuals (e.g., consumers, vendors, marketers, etc.) to research bundles, price bundles, or negotiate aspects of bundles. Table 1 presents proposed claims directed toward shopping consoles.

TABLE 1

Proposed Shopping Console Claims

| Number | Claim |
|---|---|
| 1 | An interface used in online shopping, comprising: a researching console; and a pricing and negotiation console. |
| 2 | The interface of claim 1, wherein the researching console shows a list populated using information from prior bundle requests. |
| 3 | The interface of claim 1, wherein the researching console shows a list having at least one unnatural bundle. (e.g., camera & cell phone; camera and mattress, naturalness may be a function of the store.) |
| 4 | The interface of claim 1, further comprising a listing that compares de novo bundle with existing bundles to demonstrate average advantages to different types of shoppers. |
| 5 | The interface of claim 1, further comprising a listing that compares de novo bundle with existing bundles to demonstrate average advantages to shoppers for different types of goods. |
| 6 | The interface of claim 1, wherein at least one of the consoles has animated expansion of multiple portions, where a first one of the portions expands at expense of at least one other of the portions. |
| 7 | The interface of claim 1, further comprising a reminder to resolve unresolved items of a bundle. |
| 8 | The interface of claim 1, further comprising a list that shows bundle prices over the last X months (e.g., X = 3, 6, 12, 18, etc.) |
| 9 | The interface of claim 1, further comprising an interface for tracking purchasing activities. |

(J.2) Flash Mob Shopping

In some embodiments, methods of group buying are employed. Contemplated methods include securing some level of commitment from shoppers and sellers. Selling prices can be revealed slowly, possibly in a graduated manner. Communication among the shoppers can be facilitated, possibly through an impromptu forum. Table 2 presents proposed claims directed toward flash mob shopping.

TABLE 2

Flash Mob Shopping

| Number | Claim |
|---|---|
| 1 | A method of group buying, comprising: securing soft commitments from both shoppers and sellers; revealing at least one seller's pricing information in a graduated manner; facilitating communication among the shoppers. (e.g., impromptu bulletin board) |
| 2 | The method of claim 1, further comprising identifying at least two sellers to fulfill one sale. |
| 3 | The method of claim 1, further comprising identifying at least two sellers to fulfill all sales. |
| 4 | The method of claim 1, further comprising identifying a first subset of the shoppers as committed shoppers and a second subset of shoppers as grouped shoppers, such that there are fewer committed shoppers than grouped shoppers. |
| 5 | The method of claim 1, further comprising transmitting identifiers of shoppers to at least one of the sellers. |
| 6 | The method of claim 5, further comprising letting shoppers give information to an operator of the method, and the operator transmitting the information to at least one of the sellers. |

(J.3) Algorithms

The disclosed techniques can also be supported by one or more algorithms directed to improving a shopper's experience. For example, a discount can be computed based on a shopper's activity, past or present. Table 3 presents proposed claims directed toward algorithms for shopping, especially for calculating a discount.

TABLE 3

Computing Discounts

| Number | Claim |
|---|---|
| 1 | A method of computing a discount for an individual shopper, comprising: collecting information on past shopping activities; collecting information on shopping activities after the individual's shopping activity; and computing a discount partially based on past shopping activities. |
| 2 | A method of claim 1, further comprising viewing the past shopping activities with respect to the individual shopper. |
| 3 | A method of claim 1, further comprising viewing the past shopping activities with respect to a set of previous shoppers. |
| 4 | A method of claim 1, further comprising computing the discount using finer granularity of individual items in a bundle than merely standard discounts given to a syndicator by a vendor. (e.g., a travel agent having a relationship with hotel, vacation service, etc.) |
| 5 | A method of claim 1, further comprising basing the discount upon the individual's buying activities over time. |
| 6 | A method of claim 1, further comprising timing the discount according to the individual's likely purchasing window, for a different product/service or a non-cyclical product/service than the individual purchased previously. (e.g., buy car, and 1 year later go on vacation) |
| 7 | A method of claim 1, further comprising combining the discount with a group purchasing offer. |
| 8 | The method of claim 1, further comprising computing the discount partially dependent upon shopping activities after the individual's shopping activity. |

(J.4) Group Bundle Construction

In some embodiments, multiple users (e.g., shoppers, vendors, consumers, etc.) can work together to formulate a bundle. The users can form bundles collectively, possibly through voting, or form bundles individually. In a preferred embodiment, an on-line shopping service presents the constructed bundles to other consumers beyond those that participated in constructing the bundles. Users can offer indications reflecting their preferences for items that should be included in a bundle, possibly by voting, providing thumbs up or down, rating bundles or items on an absolute or relative scale, or other methods. Bundles can also be associated with one or more characteristics of the users, including a persona, a profession, or an organization. In some embodiments, vendors that source or sell bundles or items from the bundles can offer their wares via one or more data feeds into the shopping service. Table 4 presents proposed claims directed toward constructing bundles of items.

TABLE 4

Constructing Bundles

| Number | Claim |
|---|---|
| 1 | A method of constructing bundles comprising:<br>identifying a first purchasable item (e.g., computer, could be service, could be rental);<br>providing an interface through which any of a plurality of users can indicate a preference for inclusion of second item (e.g., memory, monitor, network, printer) in first and second bundles that include the first item (i.e., voting); and<br>presenting the users the first and second bundles along with vendors that can source the first and second bundles. |
| 2 | The method of claim 1, wherein the first bundle is constructed by a single user. |
| 3 | The method of claim 1, further comprising searching for the vendors that can source the first and the second bundles. |
| 4 | The method of claim 3, wherein the first bundle is sourced from at least two different vendors. |
| 5 | The method of claim 1, wherein the step of presenting the first and the second bundles includes ranking the bundles by popularity. (e.g., by votes) |
| 6 | The method of claim 1, wherein the step of presenting the first and the second bundles includes ranking vendors according to sale price of the bundles. |
| 7 | The method of claim 1, further comprising granting authorization for a user to change the first bundle based on the user's affiliation. (e.g., user is a member of a group, club, registry, etc.) |
| 8 | The method of claim 1, further comprising providing a starter bundle from which the first and the second bundles can be constructed. |
| 9 | The method of claim 1, wherein items from the first bundle are sourced from different ones of the vendors. |
| 10 | The method of claim 1, further comprising allowing the first bundle to change over time based on the preferences of the users. |

(J.5) Auto Created Bundles

In yet other embodiments, a bundling system can allow a user to establish bundles of items based on desired characteristics of a bundle. The system preferably offers a user an interface through which the user can define desirable bundle characteristics. The characteristics can be mapped to one or more items of an existing or known bundle. The system can use the defined characteristics to automatically generate a new de novo bundle having different items that are equivalent, possibly fungible, with the items of the known bundle and that have not been selected by the user. The de novo bundle and known bundle can be compared by presenting an item-by-item comparison to the user. Table 5 presents proposed claims directed toward automatically generated bundles.

TABLE 5

Auto Created Bundles

| Number | Claim |
|---|---|
| 1 | A method of bundling goods and services for a user, the method comprising"<br>providing an interface through which a user can define at least one desired characteristic of a desired bundle;<br>mapping the at least one characteristic to a first and second item in a known bundle;<br>using the at least one characteristic to automatically compute a de novo bundle having third and fourth times that are equivalent to the first and the second items, respectively, which are not expressly selected by the user; and<br>presenting an item by item comparison between the known and de novo bundles to the user. |
| 2 | The method of claim 1, wherein the bundle is a functional bundle. |
| 3 | The method of claim 1, wherein the bundle is a loose bundle. |
| 4 | The method of claim 1, wherein the first and the third items are fungible with respect to a functionality expressed by the at least one characteristic (e.g., a memory capacity, speed, size, etc.). |
| 5 | The method of claim 1, wherein the first and the third items are from different manufacturers. |
| 6 | The method of claim 1, wherein the step of presenting the item-by-item comparison includes normalizing a descriptions of the items. |
| 7 | The method of claim 1, wherein the step of computing the de novo bundle is performed based on compatibility of the first and the second items. (e.g., the items work together). |

Desired characteristics could be size, dimensions, shape, color, weight, functionality, price, brand, model, part, configuration, specifications specific to a class of products (e.g., speed, capacity, SLR vs Point-and-shoot, paper-back vs hardcover).

Desired characteristics can also be defined for services. For instance, desired characteristics for a family vacation could be: father wants golf and all you can eat prime rib; mother wants spa and romantic dinner; kids want seeing live dolphins; and total cost of the vacation is under $1000. A known bundle could be Sheraton mid-winter family package, with first and second components as Sheraton golf course and greater LVN marine life sciences center. A computed, de novo bundle could be a do it yourself package: drive to Long Beach, use city golf course, visit Long Beach aquarium.

Desired characteristics can also be defined for purchasing. A shopper can desire to purchase a bundle of several components from one store, or from one online mall (e.g., Amazon Marketplace, for another example, NewEgg Mall), or from at most two stores. A shopper can also desire to do limited driving in purchasing a bundle. A shopper can also desire to have limited shipping costs in purchasing a bundle.

A product name needs to normalized, so that the same product offered from different sellers can be compared. For example, the product "Canon PowerShot G9 Digital Camera" is variously called by different sellers "Canon G9", "PowerShot G9", "Canon 12.1 MP g9 digital camera".

A product name needs to be classified, its specifications identified, in order to participating in the calculation of de novo bundles. For example, a defined characteristics of a bundle is "2G Security Digital memory card". In order for the product named "Kingston 2 gig SD memory card" to be recognized as qualified for the defined characteristics, it is needed that "Kingston 2 gig SD memory card" is classified as a memory card, and that its capacity is identified as "2G", and its type as "Security Digital".

Whether two products are compatible can often be described by rules. Such rules often involve relationship between specifications of the two products. For example, for a digital camera to fit in a case, the dimensions of the camera must be smaller than the interior dimensions of the case. For another example, for a digital camera to work with a memory card, the type of the memory card must be among the memory card types that the digital camera is known to work with. Sometimes several rules are applied in order to test whether two products are compatible with each other.

Once it is determined a list of candidate bundles that satisfy the defined characteristics, a ranking method can be used in sorting the possibly many candidates. Such a ranking method can aim at optimize the total price, the perceived savings, the convenience in shopping, among other possible factors.

(J.6) Bill of Material (BOM) Optimization

The disclosed techniques can also be applied to optimizing BOMs from multiple users. BOMs can be aggregated to form a master BOM which can then be used to shop for items in the BOMs. A BOM can be considered a functional bundle. The total price for the master BOM can be optimized by leveraging the volume of all the individual BOMs. Table 6 presents proposed claims for optimizing BOMs.

TABLE 6

BOM Optimization

| Number | Claim |
|---|---|
| 1 | A method of optimizing a Bill of Materials (BOM), the method comprising: providing a BOM definition interface capable of allowing a user to define a BOM proposal; aggregating a plurality of BOM proposals into a master BOM; and optimizing a price for the master BOM by sourcing items on the master BOM from a plurality of different vendors. |
| 2 | The method of claim 1, wherein at least two of the vendors supply a common item on the master BOM. (e.g., 100 units come from vendor A and 200 additional units of the same kind come from vendor B) |
| 3 | The method of claim 1, wherein the step of optimizing a price of the master BOM includes allowing the different vendors to bid on the items. |
| 4 | The method of claim 1, wherein at least some of the plurality of BOM proposals originate from different companies. |
| 5 | The method of claim 1, wherein at least two of the plurality of BOM proposals have overlapping items. |

(J.7) Bundle Manipulation

Some embodiments utilizing the disclosed techniques provide for manipulating existing bundles by a consumer. For example, an on-line service can be established that allows a consumer to compare bundles from third parties other than the service. The bundles can be tweaked via a user interface to create a new bundle. The service can then identify one or more vendors that are willing to supply the new bundle. Through the interface, it is conceived that the user is shown the major difference between a component of an existing bundle, and the alternatives. For example, for a basket of grocery items, one component of the bundle could be bread, and it happens that the bread is a loaf of brand name bread. Through the interface, the user is shown a generic loaf of bread as an alternative, with differences in prices and weight also shown.

Table 7 presents proposed claims for bundle manipulations.

TABLE 7

Bundle Manipulation

| Number | Claim |
|---|---|
| 1 | A method of manipulating a purchasable bundle of items, the method comprising: providing a service capable of comparing bundles available from third parties; crawling the web for existing bundles sourced from by the third parties; presenting at least one of the existing bundles along with a source offering the at least one existing bundle; providing an interface through which a user can tweak items of the at least one existing bundle to create a new bundle; and identifying a second source for the new bundle that is different from the source of the at least one existing bundle. |
| 2 | The method of claim 1, wherein the source of the at least one existing bundles comprises an e-commerce site. |
| 3 | The method of claim 1, further comprising allowing the user to purchase the new bundle directly from the second source. |
| 4 | The method of claim 1, further comprising allowing the user to purchase the new bundle through the service. |
| 5 | The method of claim 1, wherein the step of identifying a second source includes identifying a third source for the new bundle. |
| 6 | The method of claim 5, further comprising allowing the second and third source to bid against each other to establish a sales price for the new bundle. |
| 7 | The method of claim 1, wherein the bundle comprises a functional bundle. |

(J.8) Bundle Futures Marketplace

It is contemplated that an electronic marketplace can be established for consumer defined bundles. For example, a consumer could define a bundle of items that vendors would compete to fulfill. Furthermore, the vendors can bid on establishing future prices for the bundle to be sold in the future. The "futures" of the bundles are contemplated to include guaranteed prices for a set number of the bundles. Table 8 presents proposed claims for bundle futures marketplace.

TABLE 8

Bundle Futures Marketplace

| Number | Claim |
|---|---|
| 1 | An electronic market place comprising: a computer implemented consumer interface allowing a consumer to define an order for a bundle of items a computer implemented vendor interface allowing a vendor to bid a price for the order; and wherein the vendor interface allows the vendor to bid on prices for futures of the order. |
| 2 | A method of selling a bundle of items, the method comprising: accepting an order for a consumer defined bundle of items; accepting price bids from a plurality of vendors where the price bids represent a selling price for the bundle; accepting future price bids from the vendors where the future price bids represent a future selling price for the bundle in the future; selling the bundle to a first consumer at one of the selling prices; and selling the bundle to a second consumer at one of the future selling prices. |
| 3 | A method of selling a bundle of items, the method comprising: accepting a defined bundle of items defined by a first consumer at a first time; accepting future price bids from a plurality vendors where the future price bids represent a future selling price for the bundle in a future time from the first time; and selling the bundle to a second consumer at one of the future selling prices at the future time. |

Thus, specific embodiments and applications of auction methods and related improvements have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A method of providing pricing for a bundle of items to a user from a bundle search engine, comprising:
    providing a bundle search engine configured to collect and analyze information regarding members of a bundle submitted by a buyer;
    obtaining, via a first electronic interface provided by the bundle search engine, from the buyer bundle attributes for the members, the bundle attributes including criticality information representing a measure of desirability for inclusion of at least one of the members in the bundle, and including a price acceptance measure and a store choice, wherein the store choice specifies one or more acceptable stores from which the user may purchase a bundle and one or more stores which are excluded from consideration;
    selecting automatically, by the bundle search engine, a common one of the members based on the criticality information;
    identifying automatically, by the bundle search engine, sub-bundles according to the bundle attributes, the sub-bundles having alternative combinations of the members that compose the bundle, wherein each of the combinations includes the common member, and at least one of the members of the sub-bundles is not selected by the user;
    calculating prices automatically, by the bundle search engine, for additional versions of the bundle that include the alternative sub-bundles;
    configuring a second electronic interface to display the prices and the members of the additional versions of the bundle; and
    allowing the buyer to purchase at least one of the additional versions of the bundle via the bundle search engine.

2. The method of claim 1, wherein the step of identifying the sub-bundles includes seeding an automatic analysis of the sub-bundles by selecting a best price on the common member.

3. The method of claim 1, wherein the step of selecting the common member of the sub-bundles includes constraining the common member of the sub-bundles to be from one particular brand.

4. The method of claim 1, wherein the step of identifying sub-bundles includes constraining the alternative combinations based on a shipping selection for the common member.

5. The method of claim 1, further comprising providing a suggestion as to a change in membership of the bundle.

6. The method of claim 5, wherein the suggestion comprises a change in at least one of brand, quantity, and quality of the common member.

7. The method of claim 5, wherein the suggestion comprises a change in at least one of brand, quantity, and quality of a member other than the common member.

8. The method of claim 1, further comprising presenting additional information relating to the merits of the additional versions of the bundle via the second interface.

9. The method of claim 1, wherein the step of using the second interface to display the prices and members includes presenting the additional versions based on a weighting derived from a user profile.

10. The method of claim 1, wherein the step of identifying the sub-bundles includes identifying alternative members of the sub-bundles with respect to their compatibility to work with the common member.

* * * * *